United States Patent [19]
Folino

[11] Patent Number: 5,722,910
[45] Date of Patent: Mar. 3, 1998

[54] SPEED CONVERTER WITH DWELL

[75] Inventor: Frank A. Folino, Salem, Mass.

[73] Assignee: Synkinetics, Inc., Lowell, Mass.

[21] Appl. No.: 725,146

[22] Filed: Oct. 2, 1996

Related U.S. Application Data

[60] Division of Ser. No. 342,908, Nov. 21, 1994, Pat. No. 5,562,564, which is a continuation-in-part of Ser. No. 670,263, Mar. 14, 1991, Pat. No. 5,312,306, and Ser. No. 62,053, May 14, 1993, abandoned.

[51] Int. Cl.$^6$ .......................... F16H 13/04; F16H 13/08; F16H 29/00
[52] U.S. Cl. ................... 476/36; 74/25; 74/122; 475/196
[58] Field of Search .................... 74/25, 112, 122, 74/124; 476/36; 475/196

[56] References Cited

U.S. PATENT DOCUMENTS

| | | | |
|---|---|---|---|
| 2,134,603 | 10/1938 | Crosman | 74/122 |
| 4,476,735 | 10/1984 | Cantwell | 74/122 X |
| 5,016,487 | 5/1991 | Bollmann | 476/36 |
| 5,321,988 | 6/1994 | Folino | 74/25 |

*Primary Examiner*—Khoi Q. Ta
*Attorney, Agent, or Firm*—James E. Maslow

[57] ABSTRACT

Method and apparatus having a track of segments, ones of the segments having a non-varying profile, for generating a varying motion.

14 Claims, 6 Drawing Sheets

SPEED CONVERTER WITH DWELL

BACKGROUND OF THE INVENTION

This application is a divisional application of copending application Ser. No. 08/342,908, filed Dec. 21, 1994 (issuing on Oct. 8, 1996 as U.S. Pat. No. 5,562,564; Attorney Docket Number FFY004-CIP), entitled Integral Motorized Speed Converter, the latter a continuation-in-part of U.S. patent application Ser. No. 07/670,263, filed Mar. 14, 1991, now U.S. Pat. No. 5,312,306 Attorney Docket Number FFY-001, entitled: SPEED CONVERTER, of PCT Patent Application Ser. No. PCT/US92/02023, filed Mar. 13, 1992, Attorney Docket Number FFY-001PC, entitled: SPEED CONVERTER, and of abandoned U.S. patent application Ser. No. 08/062,053, filed May 14, 1993 Attorney Docket Number FFY-004, entitled: INTEGRAL MOTORIZED SPEED CONVERTER, all incorporated herein by reference.

The present invention relates to mechanical power transmissions, and more particularly, to mechanical conversion of rotary motion.

Speed conversion is an important capability in the efficient utilization of rotary motive force. In the field of power transmission it is necessary to combine a primary power source, such as an electric motor or an internal combustion engine, with a speed reducer unit to deliver the required torque at the desired speed. It is particularly useful to incorporate at least one stage of speed reduction within the housing of the drive source. These are typically referred to as gear motors or reducer motors. Various configurations of gears are used, including assemblies of planetary gears, helical gears, etc.

One advantage of having a drive source with integrated speed conversion is that an entire motor/converter assembly can be optimized for its intended use. This optimization often translates into better performance and/or lower costs.

Still, all of these gear assemblies share the same inherent disadvantage. In short, conventional gears interact one tooth at a time, and this is inherently inefficient.

It is therefore an object of the present invention to provide a motorized speed converter which is simplified in nature but is efficient and robust in transmission capability.

It is a further object of the present invention to provide a motorized speed converter which is relatively easy to assemble and service.

It is yet an additional object of the present invention to provide optimized load sharing among the elements that transmit the rotary motive force in a motorized speed converter.

SUMMARY OF THE INVENTION

These and other objects are well met by the presently disclosed, highly efficient, motorized speed converter of the invention. The invention utilizes configured drive and driven cam tracks which interact through with each other through transmitting means, namely balls. These balls react the rotary motive force input while they oscillate in slots of a reaction disk grounded to the speed converter housing. In one embodiment, each cam track is cut into the face of a flat cam disk; a flat retainer with radially extending slots is used with the flat drive and driven cam disks. In another embodiment, the cam tracks and slots are cut into the sides of cylindrical members.

In various embodiments, the drive cam mounts on an input shaft of the speed converter and the driven cam mounts on an output shaft of the speed converter, the input and output shafts being coaxial and independently rotatable. A pair of axially separated bearings is grounded to the equipment housing, and these bearings serve to journal the output shaft. Rotary motive input is provided by a motor (or other source) whose drive shaft is used as the speed converter input shaft.

The drive cam has a drive cam track defined on a surface thereof. The driven cam has a driven cam track defined on a surface thereof. The drive cam is for driving the driven cam track on the driven cam via at least one interacting element (e.g., a ball) guided in a slot of an intermediately placed reaction disk.

More particularly, in various embodiments, the cam track is a single continuous track of segments, each segment having its own profile, and wherein ones of the segments have the same profile. Or, ones of the segments have a uniform radius for defining a respective dwell period.

In a particular embodiment, the cams together comprise a conjugate pair of devices rotatable about a common axis, a first device of the pair being an input device for supply of angular velocity and rotary motive force and a second device of the pair being an output device. Means for retaining and interacting elements are for transmitting angular velocity and rotary motive force of the input device to angular velocity and rotary motive force of the output device as the interacting elements are put in motion by the input device. The input device cooperates with the in-motion interacting elements and the output device for transmitting, through all the in-motion interacting elements, the angular velocity and rotary motive force of the input device to angular velocity and rotary motive force of the output device. This transmission is preferably through all or substantially all the in-motion interacting elements, substantially equally and simultaneously. Preferably, a biasing device preloads the cams and balls together.

BRIEF DESCRIPTION OF THE DRAWINGS

These and other features and advantages of the present invention will be more fully understood by reference to the following detailed description in conjunction with the attached drawing in which like reference numerals refer to like elements and in which.

DETAILED DESCRIPTION OF PREFERRED EMBODIMENTS

One motorized speed converter embodiment 10 of the invention is shown in FIG. 1, in which a speed converter assembly 12 is coupled to the shaft 14 of a motor 16. The speed converter assembly is mounted in assembly housing 18 which mounts to motor housing 18' via bolts 18". The speed converter translates the angular velocity and rotary motive force of the motor output to a desired angular velocity and rotary motive force output.

The basic speed converter assembly 12 of the invention includes a circular-disk drive cam 20, mounted concentrically to motor shaft 14 supported by motor bearing 17. A drive cam track 22 is defined on the drive face 24 of cam 20. A circular-disk driven cam 26 is also provided, mounted concentrically to the axis of shaft 14, and from which the output is taken at output shaft 28, also mounted concentrically to the axis of shaft 14. Shaft 28 is fixed to or integral with the driven cam disk 26.

A driven cam track 30 is defined on the driven face 32 of driven cam 26. The drive and driven cams interact via rolling elements 34, e.g., balls. The balls are retained by a reaction disk 36 which is grounded to housing 18 via a bolt 38.

FIG. 2 shows the basic elements of the invention. A 12:1 speed reducer configuration is shown in FIG. 2 in which a drive cam disk 20a is provided with a single cycle cam track 22a. The balls 34 oscillate in slots 40a of the slotted reaction disk 36a as they are driven by the rotating drive cam track 22a, and these oscillating balls, by their cooperation with the flanks of the twelve cycle driven cam track 30a rotate the driven cam disk 26a.

Ideally, all cams of the invention are configured in conjugate pairs. Each pair is considered to be conjugate because they must satisfy the condition that all of the balls travel at the same constant velocity all of the time, uniformly and simultaneously, except for the moment of each ball's change of direction in the slot. The slot is longer than the anticipated ball travel and therefor does not effect this change of direction. The cams are also configured such that at this change of direction, each ball is essentially unloaded, thus reducing frictional losses. The ideal maximum number of balls is determined as one fewer than the number of cycles on the driven cam. The number of slots on the reaction disk is selected accordingly. The number of cycles on the drive and driven cams are selected according to the desired speed conversion ratio. The illustrative ratios shown herein are 12:1, but any number of cycles can be chosen so as to obtain any desired ratio.

Returning to FIG. 1, it will be seen that the motor shaft 11, through drive key 44, rotates the input drive cam 20, which interacts with the balls 34 and reaction disk 36, and the driven cam 26 to produce the desired torque and rotary motion at output shaft 28. The assembly of FIG. 1 provides highly stabilized mounting of output shaft 28, as journaled in support bearings 54, 56. Bearing 54, mounted in reaction disk journal 42, receives the interior end 58 of shaft 28. Bearing 56 is mounted in housing journal 60 and through which passes the output end 62 of shaft 28. Because bearing 56 is mounted directly to the housing and bearing 58 is mounted in the reaction disk, itself fixed to the housing, a rigid load path is provided directly to structural ground.

Together these bearings provide the necessary stability for the output shaft and its ability to react radial, thrust and moment loading from any external load. Such external loads are reacted positively and effectively by the juxtaposition and support of these bearings in the reducer housing. The reaction disk, as a web component, accepts the loads in tension and in turn this becomes hoop tension in the robust circular rim 64 of the reaction disk.

This bearing configuration effectively reacts the external loads, as well as being volumetrically efficient into the motor bearings. The housing 18, which supports the bearings, is rigidly coupled with the motor housing 18, via bolts 18". Accordingly, the cantilevered load on the output shaft is reacted and grounded without any effect on the motor bearings.

Another feature of the invention is the ability of assembling the invention and installing it on the motor shaft, simply secured with bolts 18". As a result, the assembly can be disassembled and any of the options of FIG. 2 can be installed with minimal effort. Therefore, manufacturing and assembly of these units is cost-effective and reduces inventory requirements.

The illustrative single stage unit of FIG. 1 demonstrates the invention's cost advantages of interchangeability, volumetric efficiency, high torque throughput, effective load treatment, safety, and simplicity in manufacture and construction.

Figure 3:
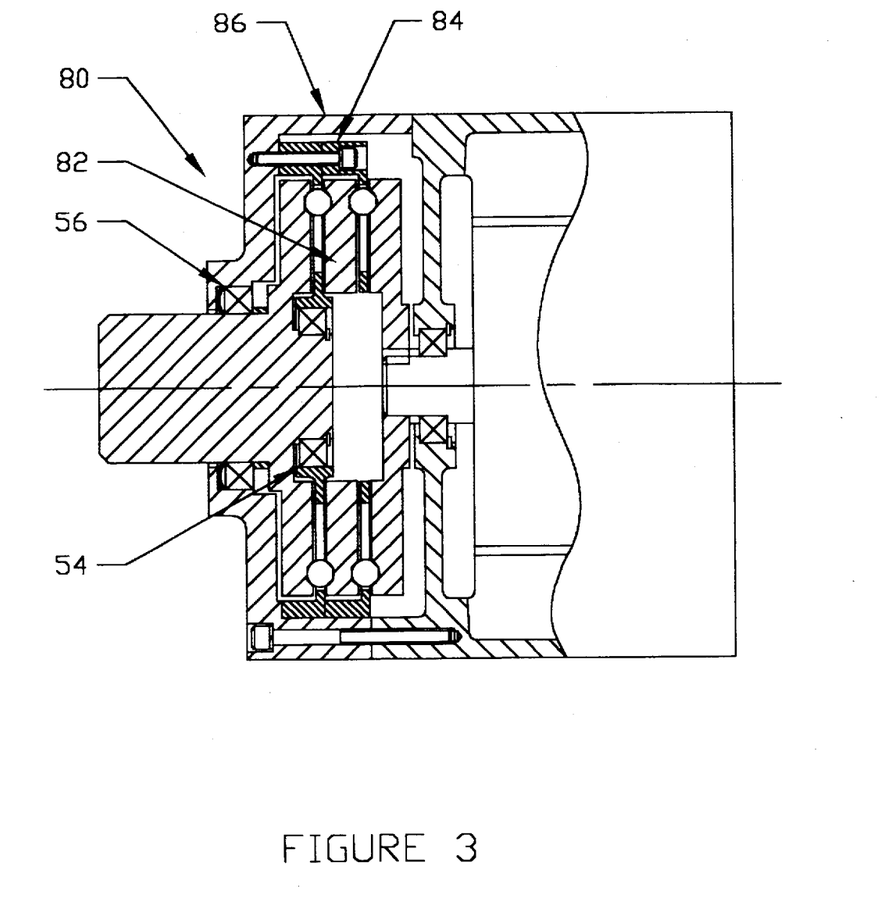
FIG. 3 is a side cross-sectional view of a motor having an integrated multi-stage speed converter according to the invention.

A two-stage illustrative embodiment 80 of the invention is shown in FIG. 3, having the same components as in FIG. 1 except for an additional interim cam 82, interim reaction disk 84 and extended housing 86. This assembly will produce higher speed reductions, such as where an x:1 first stage is coupled with a y:1 second stage. Again, the juxtaposition of bearings 54, 56 provides the effective bearing support for reacting the external loads on the cantilevered output shaft. The same ease of assembly, interchangeability and volumetric efficiency apply even more so for the very high reduction capability achieved here. Additional stages are also possible for still higher reductions, reflecting the same bearing juxtapositioning. The stages also can be mixed, such as for obtaining combinations of reductions, increases, oscillations and/or intermittent motions.

In both FIGS. 1 and 3, spring-like biasing device 88 preloads the cams and balls together. This preloading overcomes machining tolerances and track/ball wear, leading to long operational life at specification levels.

One of the benefits of integrating the speed reducer and motor in a single housing is that the speed reducer and motor can be designed for optimal cooperation, efficiency and lifetime. Furthermore, since the cantilever is isolated from the motor, motor design considerations are eased. As well, besides using one housing for two components (conventional separate speed converter and motor) in the present invention, the bearing which otherwise must be provided to support the speed converter input shaft is eliminated because the adjacent motor bearing 17 serves that purpose.

Figure 1A:
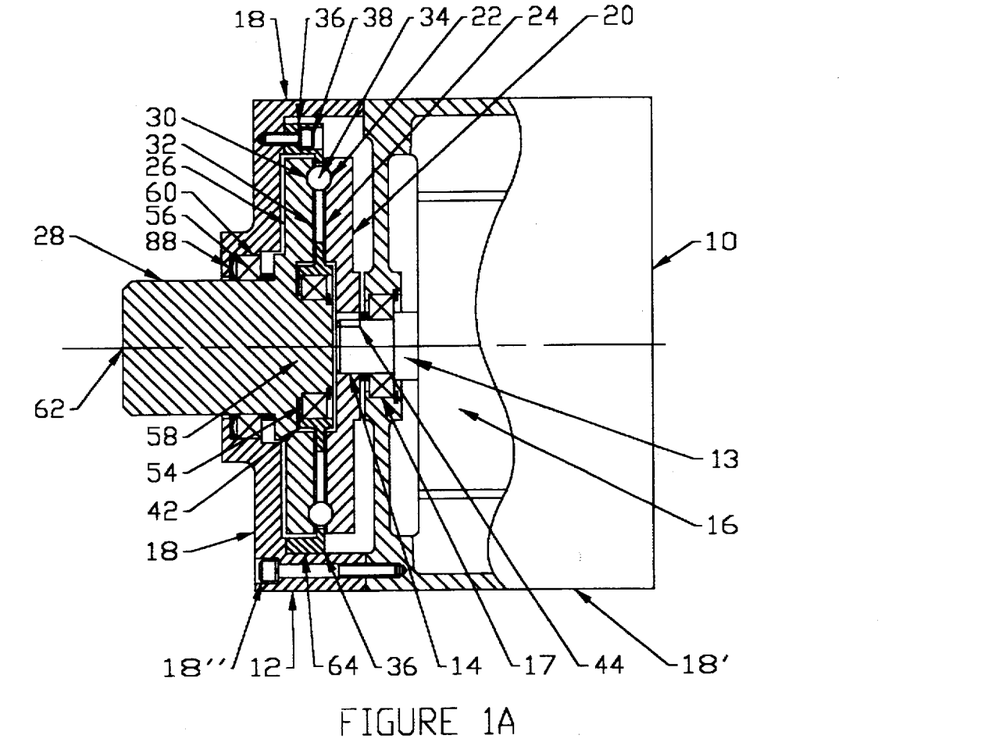
FIG. 1 is a partly broken-away side cross-sectional view of a motor having an integrated speed converter according to the invention.

In an alternative embodiment of the invention, as shown in dotted outline in FIG. 1A, the reaction disk grounding bolt 38 takes the form of a shaft or pin 70 (e.g., the bolt head is), the pin being the actuated shaft of a solenoid assembly 72 mounted on housing 18. A sensing device 74 is mounted on motor housing 18' and is coupled to the motor for sensing rotation of the motor shaft. The motor is driven by motor controller/drive 76. The motor controller/drive 76 includes a solenoid drive 78 which is automatically activated by the motor controller/drive when the motor is being driven and a sudden and continuous drop in motor output is sensed by sensor 74, indicative of a falling or ceased motor. When the solenoid is activated, pin 70 is withdrawn, ungrounding reaction disk 26, and preventing damage to the entire assembly.

Specifically, in the event of failure of the drive motor, such as when it ceases, the momentum of the load continues to turn the driven disk 26 and this can damage the invention because the input disk 20 is now effectively grounded via the seized motor. But by use of the solenoid, ungrounding the reaction disk so that it can be a free-wheeling output prevents such damage to the speed converter assembly. This feature alone is quite beneficial, since in a geared assembly, a similar seizure condition could result in stripped or broken gear teeth.

The solenoid can also be selectively activated by the user via the motor controller 76, such as when the load coupled to the speed converter output must be moved independent of the speed converter. In fact, it is one of the features of invention that in one embodiment the speed converter unit is bi-directional from the input end and not backdriveable from the output end, and therefore such quick disconnect ability facilitates user-selected independent movement of the load as needed.

According to the above embodiments, for any constant angular velocity input, the output will rotate at a constant angular velocity at the converted output speed, when the retainer is fixed, or will be modulated if the retainer angular velocity is modulated.

In an alternative embodiment of the invention, the ball drive speed reducer takes the form of an intermittent motion drive. In this embodiment, the drive cam, reaction disk and driven cam are still required, although with variation of the cam curvature in the drive cam, and ball geometry. It is possible to interchange the intermittent motion drive cam for the drive cam of a ball drive speed reducer, so as to convert from the smooth, continuous output of the ball drive to an indexing mode of a smooth intermittent motion drive output.

To achieve the intermittent motion, dwell periods are incorporated into the drive cam curvature. The slope of the curve at any time during the dwell period is zero. With this zero slope, the balls are fixed radially in position in their slots and do not produce the necessary radial displacement of the balls to drive the driven cam. Under this condition, the drive cam rotates and the driven cam remains stationary. This dwell is accomplished by making the cam curvature in the drive cam a constant radius for the arc length that is equal to the required dwell period. The design of such an intermittent motion cam includes a rise and fall cycle along with a dwell cycle. Any combination of rise, fall and dwell cycles are possible to achieve any desired intermittent motion.

Figure 4:
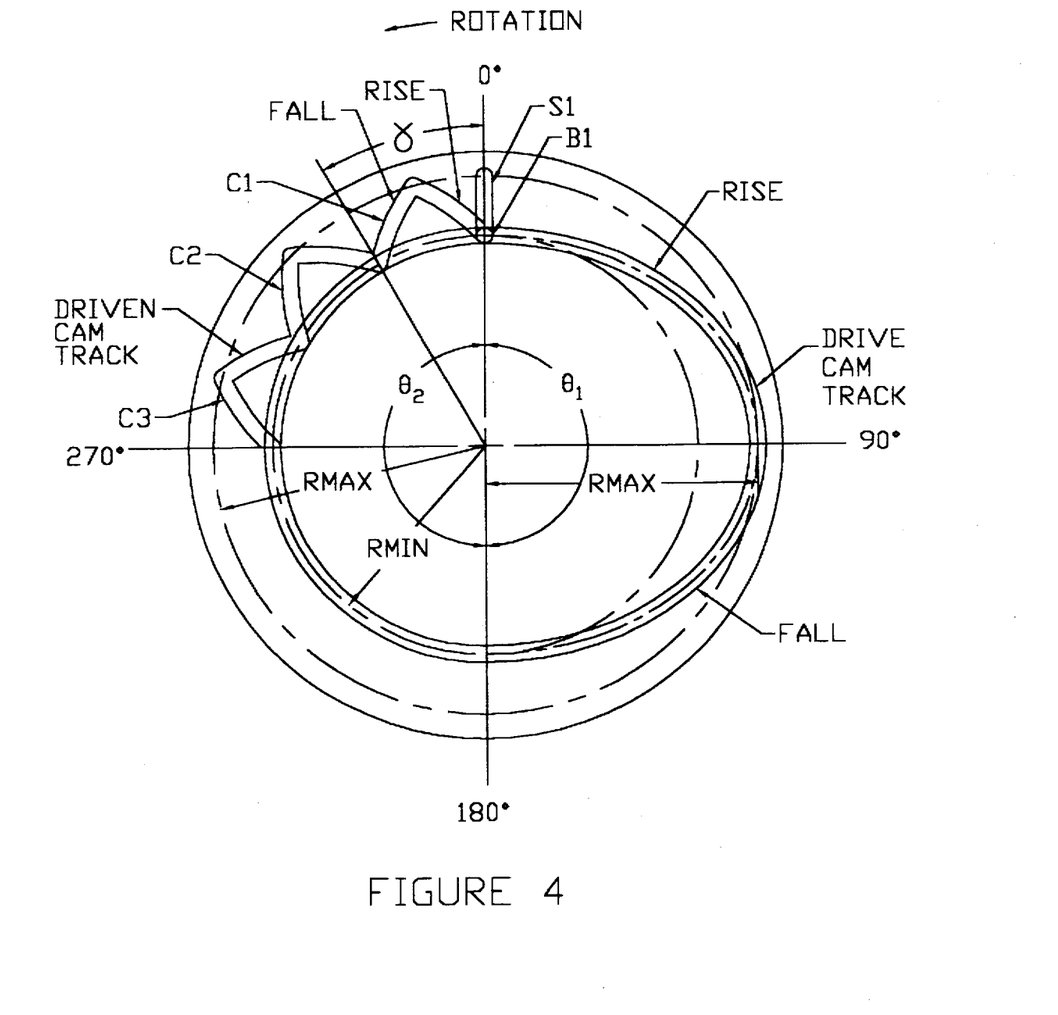
FIG. 4 is an overlay view of an intermittent motion embodiment of the invention.
Figure 5A:
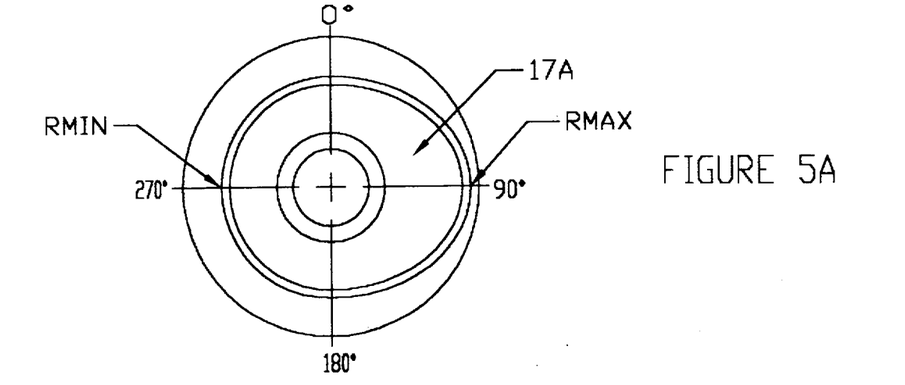
FIG. 5 is an illustration of the basic elements of the invention of FIG. 4.
Figure 5B:
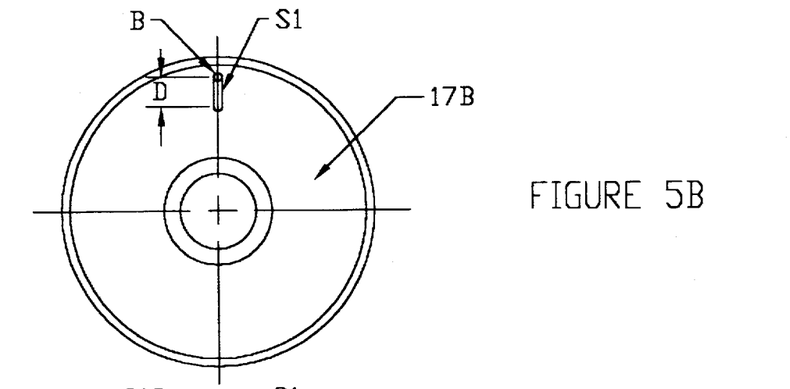
Figure 5C:
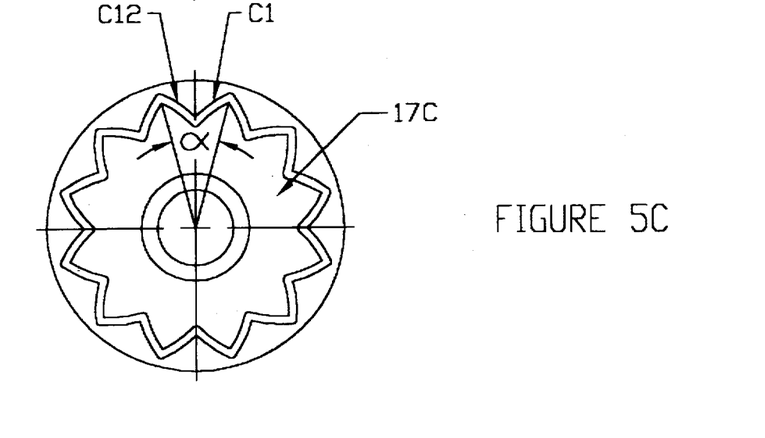

FIG. 4 illustrates one of many examples of intermittent motion and for this case is a basic one cycle configuration with equal times of rotating and dwelling. The drive cam curvature, FIG. 5A, includes a rise cycle from $R_{min}$ at 0° to $R_{max}$ at 90°, a fall cycle from $R_{max}$ at 90° to $R_{min}$ at 180° and from 180° to 360° a constant radius $R_{min}$. The driven cam, FIG. 5C, has the same twelve cycles $C_1$ through $C_{12}$. The reaction disk FIG. 5B has one slot $S_1$ for a single ball B.

In operation, for one rotation of the drive cam the following action occurs. From 0° to 180° of the drive cam, a rise and fall cycle will occur displacing the ball B in slot $S_1$ of the reaction disk radially in and out, a displacement D. This ball displacement will in turn interact with cycle $C_1$ of the driven cam and rotate the output an angle α which in this case, for 12 cycles, will be 30°. As the drive cam continues to rotate from 180° to 360°, the constant radius $R_{min}$, at which the ball B was positioned at the completion of 180° rotation, will not displace the ball radially thereby precipitating no drive interaction with the driven cam and thereby reflecting no rotation of the output shaft. During this segment the output shaft is in a dwell mode. In this example, the ratio of rotation to dwell is 1:1, i.e., in one rotation of the drive cam in two seconds, the driven cam rotates one cycle in one second and dwells one second. For 12 rotations of the drive cam there will be one complete rotation of the driven cam, with intermittent action.

It should now be clear that by changing the angles that develop the drive and dwell functions, many ratios and combinations of drive and dwell modes are possible. It is also possible to provide more than one ball for increasing the torque throughput capacity of the intermittent unit.

Figure 6:
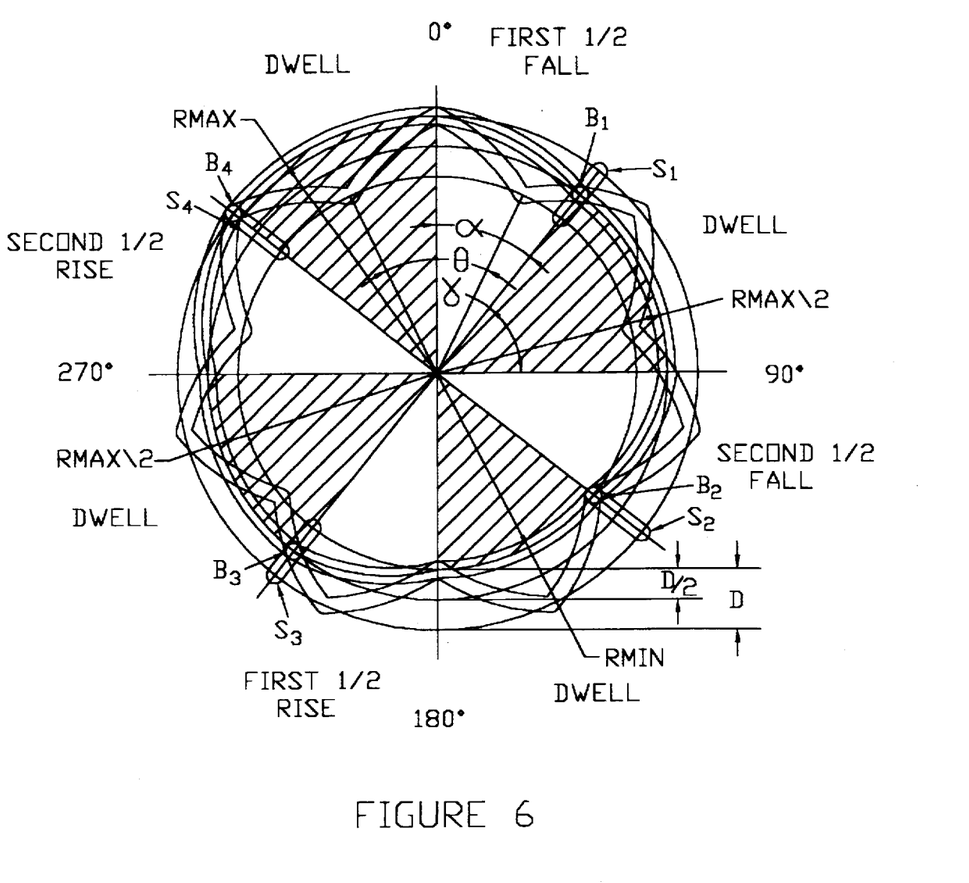
FIG. 6 is an overlay view of an alternative intermittent motion embodiment of the invention.

In FIG. 6 the drive cam includes two rise segments (to achieve displacement D from the starting radius), and two fall segments (to return to the starting radius) and four dwell cycles. The balls are equally spaced, 90° apart. A seven cycle driven cam is also shown for this configuration.

The following intermittent motion occurs for a clockwise rotation of the drive cam of FIG. 6, which is shown from the 0° position. For an α rotation of the drive cam, the first ½ fall cycle displaces the ball ½D and this in turn rotates the driven cam an angle θ/4, where θ equals the subtended angle of each cycle of the driven cam. The drive cycle now rotates an angle γ, during which the driven cam dwells, since the dwell curvature is now positioned to engage the ball (which occurs at all during this dwell period). With no radial displacement of the balls, the driven cam remains stationary and will dwell through this mode. Ball B1 has fallen from Rmax to Rmax/2 and is in position to engage the dwell radius Rmax/2. Similarly, the next ball B2 has fallen to Rmin from Rmax/2 is in position to engage the dwell radius at Rmin. Balls B3 and B4 proceed accordingly. The dwell curvature can be shortened or lengthened to produce shorter or longer time delays.

In like manner, and in further rotation of the drive cam, similar rotations and dwells will occur alternately so that for 360° rotation of the drive cam, the driven cam (the output shaft of the intermittent motion drive) will rotate θ and dwell an amount of time equivalent to γ rotation of the drive cam. There will be four such cycles for the 360° of drive cam rotation, resulting in four angular rotations of θ/4 that alternate with four dwell periods of γ.

It is practical therefore to convert a ball speed reducer of this invention with its smooth continuous rotation to an intermittent motion drive by interchanging an intermittent drive cam with a displacement D equal to the drive cam of the ball speed reducer with an appropriate number of balls. Of course dedicated intermittent motion drive assemblies can be manufactured as well, and a modulated-speed converter may be applied to the intermittent embodiment of the invention, so as to be able to be able to vary the cycle time.

It will be understood that the above description pertains to only several embodiments of the present invention. That is, the description is provided by way of illustration and not by way of limitation. For example, there are many variations of the cam combinations that are possible in practice of the present invention. As well, in various of the foregoing embodiments, additional cam cycles and balls/slots may be employed. The invention is further characterized according to the following claims.

What is claimed is:

1. Apparatus for converting a rotary motion input to an intermittent motion output, comprising rotatable input and output devices coupled together by and interacting via at least one interacting element, said input device having rotatable drive means for supply of angular velocity and rotary motive force to said output device, said output device having a rotatable driven means for receipt of said angular velocity and rotary motive force from said drive means, said rotatable means located coaxially about a common axis of the apparatus, slot means having at least one slot, said slot adapted to receive therein said interacting element, said slot means located with said conjugate pair relative to said common axis, said slot defining a travel axis, one of said devices having a flank portion with a non-varying dimension relative to said travel axis, one of said devices having a flank portion with a varying dimension relative to said travel axis, said drive means cooperating with said slot means and said driven means for converting rotation of said input to rotation of said output as defined by said flank portion with varying dimension, wherein said output rotation is interrupted accordingly to said flank portion non-varying dimension, the time period of such interruption defining a dwell period in said output rotation.

2. The apparatus of claim I wherein said drive means comprises a drive track, and wherein said driven means comprises a driven track.

3. The apparatus of claim 1 wherein one of said drive and drive means defines a continuous track of track segments.

4. The apparatus of claim 3 wherein each said track segment has the same predetermined profile.

5. The apparatus of claim 3 wherein said continuous track is defined on said drive means.

6. The apparatus of claim 3 wherein at least one of said track segments defines said flank portion non-varying dimension.

7. The apparatus of claim 2 further comprising a plurality of interacting elements, said slot means comprising a plurality of slots, each slot for receipt of one of said interacting elements.

8. The apparatus of claim 7 wherein said interacting elements are balls and said slots are through-slots.

9. The apparatus of claim 3 wherein ones of said segments have a uniform radius for defining a respective said dwell period in said rotation.

10. The apparatus of claim 9 wherein ones of said segments have a non-uniform radius for defining said rotation of said output.

11. The apparatus of claim 1 wherein said drive means comprises a drive cam disk and a continuous drive cam track defined on a face of said drive cam disk.

12. Apparatus for converting a rotary motion input to an intermittent motion output, comprising rotatable input and output devices coupled together by and interacting via at least one interacting element, said input device having rotatable drive means for supply of angular velocity and rotary motive force to said output device, said output device having a rotatable driven means for receipt of said angular velocity and rotary motive force from said drive means, said rotatable means located coaxially about a common axis of the apparatus, slot means having at least one slot, said slot adapted to receive therein said interacting element, said slot means located with said conjugate pair relative to said common axis, said slot defining a travel axis, one of said devices having a flank portion with a non-varying dimension relative to said travel axis, said drive means cooperating with said slot means and said driven means for converting rotation of said input to rotation of said output, wherein said output rotation is interrupted accordingly to said flank portion non-varying dimension, wherein one of said drive and driven means defines continuous track segments, wherein ones of said segments have a uniform portion for defining the time period of such interruption as a respective dwell period in said output rotation.

13. The apparatus of claim 12 wherein said uniform portion comprises a uniform radius.

14. The apparatus of claim 13 wherein ones of said segments have a non-uniform radius.

* * * * *

UNITED STATES PATENT AND TRADEMARK OFFICE
CERTIFICATE OF CORRECTION

PATENT NO : 5,722,910
DATED : Mar. 3, 1998
INVENTOR(S): Frank A. Folino

Figure 1B:
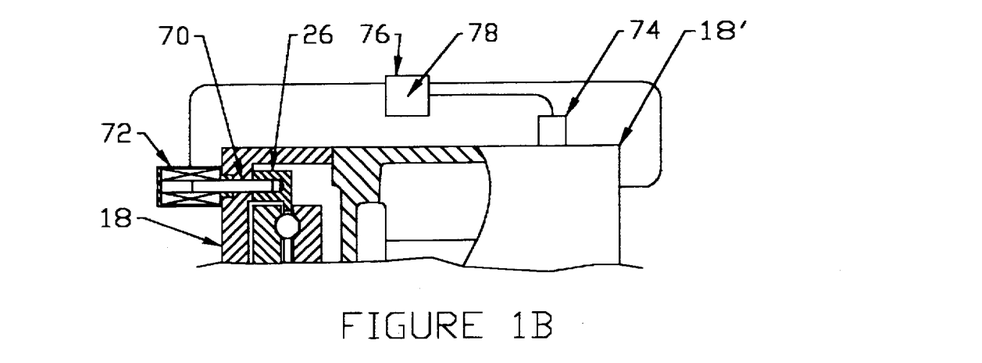
Figure 2A:
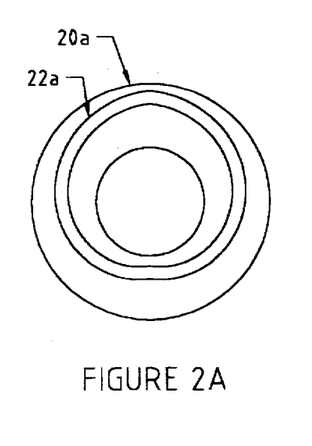
FIG. 2 is an illustration of the basic elements of the invention.
Figure 2B:
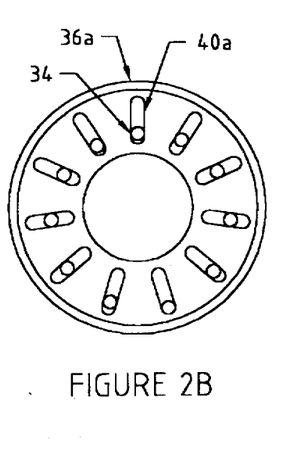
Figure 2C:
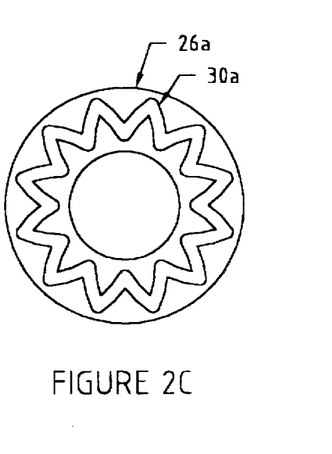

It is certified that error appears in the above-identified patent and that said Letters Patent is hereby corrected as shown below:

Col. 2, line 44, "1" should read --1A--.
Col. 2, after line 46, insert the following paragraph:
 --Figure 1B is an alternate embodiment of the invention shown in Figure 1A.--
Col. 2, line 47, "Figure 2 is an illustration" should read --Figures 2A, 2B and 2C are illustrations--.
Col. 2, line 63; Column 3, lines 40 and 44; Column 4, lines 8 and 28; "1" should read --1A--.
Col. 3, line 16 and 17; column 4, line 4, "Figure 2" should read --Figures 2A, 2B and 2C--.
Col. 3, line 16, "shows" should read --show--.
Col. 4, line 44, "1A" should read --1B--.

Signed and Sealed this

Eleventh Day of August 1998

Attest:

BRUCE LEHMAN

*Attesting Officer*          *Commissioner of Patents and Trademarks*